US 9,398,453 B2

(12) United States Patent
Krishnaswamy et al.

(10) Patent No.: US 9,398,453 B2
(45) Date of Patent: Jul. 19, 2016

(54) AD HOC SERVICE PROVIDER'S ABILITY TO PROVIDE SERVICE FOR A WIRELESS NETWORK

(75) Inventors: Dilip Krishnaswamy, Del Mar, CA (US); Atul Suri, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 541 days.

(21) Appl. No.: 11/861,279

(22) Filed: Sep. 26, 2007

(65) Prior Publication Data

US 2009/0046591 A1 Feb. 19, 2009

Related U.S. Application Data (60) Provisional application No. 60/956,658, filed on Aug. 17, 2007.

(51) Int. Cl.
*H04W 12/06* (2009.01)
*H04L 29/06* (2006.01)
(Continued)

(52) U.S. Cl.
CPC .............. *H04W 12/06* (2013.01); *H04L 63/029* (2013.01); *H04L 63/08* (2013.01); *H04W 84/18* (2013.01); *H04W 88/04* (2013.01)

(58) Field of Classification Search
CPC .......... H04W 72/048; H04W 72/0486; H04W 72/0493; H04W 12/06; H04W 84/18; H04W 88/04; H04L 63/029; H04L 63/08
USPC ......... 370/252, 311, 331, 338, 350, 392, 469, 370/235; 455/518, 406, 550.1, 436, 445, 455/525, 552.1; 725/123
See application file for complete search history.

(56) References Cited

U.S. PATENT DOCUMENTS 5,263,121 A 11/1993 Melsa et al.
5,301,359 A 4/1994 Van Den Heuvel et al.
(Continued)

FOREIGN PATENT DOCUMENTS

CN 1342377 A 3/2002
CN 1360795 A 7/2002
(Continued)

OTHER PUBLICATIONS

Sethom et al: "Secure and seamless mobility support in heterogeneous wireless networks" Global Telecommunications Conference 2005. GLOBECOM '05. IEEE St. Loius, MO, USA, Nov. 28-Dec. 2, 2005, Psicataway, NJ, USA, IEEE. vol. 6, Nov. 28, 2005, pp. 34.
(Continued)

*Primary Examiner* — Brian D Nguyen
*Assistant Examiner* — Toan Nguyen
(74) *Attorney, Agent, or Firm* — Howard Seo (57) ABSTRACT

An ad hoc service provider for a wireless network, a method for providing service from a mobile node, and a machine-readable medium are disclosed. An ad hoc service provider includes a processing system configured to support first and second wireless access protocols and to alter the ad hoc service provider's ability to provide service for a wireless network in response to a resource related event. A method includes sending a request that a mobile node be allowed to provide service as an ad hoc service provider, detecting a resource related event of the mobile node for a wireless network, and altering the mobile node's ability to provide service for the wireless network. A machine-readable medium includes instructions for detecting a resource related event of a mobile node, and altering the mobile node's ability to provide service as an ad hoc service provider for a wireless network based on the detection.

28 Claims, 6 Drawing Sheets

(51) Int. Cl.
 *H04W 84/18* (2009.01)
 *H04W 88/04* (2009.01)

(56) References Cited

U.S. PATENT DOCUMENTS

| | | | |
|---|---|---|---|
| 5,999,813 | A | 12/1999 | Lu et al. |
| 6,125,185 | A | 9/2000 | Boesch |
| 6,240,073 | B1 | 5/2001 | Reichman et al. |
| 6,275,712 | B1* | 8/2001 | Gray et al. ............ 455/522 |
| 6,295,453 | B1 | 9/2001 | Desgagne et al. |
| 6,377,805 | B1 | 4/2002 | Anvekar et al. |
| 6,650,900 | B1 | 11/2003 | Chavez, Jr. et al. |
| 6,735,417 | B2 | 5/2004 | Fonseca et al. |
| 6,788,656 | B1 | 9/2004 | Smolentzov et al. |
| 6,871,071 | B2 | 3/2005 | Takao et al. |
| 6,879,574 | B2 | 4/2005 | Naghian et al. |
| 6,961,575 | B2 | 11/2005 | Stanforth |
| 6,970,422 | B1 | 11/2005 | Ho et al. |
| 7,003,117 | B2 | 2/2006 | Kacker et al. |
| 7,046,647 | B2 | 5/2006 | Oba et al. |
| 7,089,417 | B2 | 8/2006 | Wack et al. |
| 7,110,372 | B2 | 9/2006 | Kovacs et al. |
| 7,123,908 | B2 | 10/2006 | Chandler |
| 7,155,518 | B2 | 12/2006 | Forslow et al. |
| 7,161,914 | B2 | 1/2007 | Shoaib et al. |
| 7,170,878 | B2 | 1/2007 | Fukuda |
| 7,254,119 | B2 | 8/2007 | Jiang et al. |
| 7,266,374 | B2 | 9/2007 | Kim |
| 7,266,383 | B2* | 9/2007 | Anderson ............ 455/518 |
| 7,295,532 | B2 | 11/2007 | Haller et al. |
| 7,313,363 | B2 | 12/2007 | Davis et al. |
| 7,339,915 | B2 | 3/2008 | Jakkahalli |
| 7,340,253 | B2 | 3/2008 | Laporta et al. |
| 7,346,167 | B2 | 3/2008 | Billhartz et al. |
| 7,349,370 | B2 | 3/2008 | Lee et al. |
| 7,362,731 | B2 | 4/2008 | Vinayakray-Jani |
| 7,363,050 | B2* | 4/2008 | Nakano ............ 455/525 |
| 7,394,826 | B2* | 7/2008 | Cain et al. ............ 370/469 |
| 7,408,929 | B2 | 8/2008 | Adachi et al. |
| 7,420,952 | B2* | 9/2008 | da Costa et al. ............ 370/338 |
| 7,444,152 | B2 | 10/2008 | Wu et al. |
| 7,486,651 | B2 | 2/2009 | Hagiwara et al. |
| 7,496,363 | B2* | 2/2009 | Salkintzis ............ 455/436 |
| 7,519,071 | B2 | 4/2009 | Thubert et al. |
| 7,551,576 | B2 | 6/2009 | Ahmavaara |
| 7,552,234 | B2 | 6/2009 | Thubert et al. |
| 7,573,904 | B2 | 8/2009 | Pichna et al. |
| 7,577,108 | B2 | 8/2009 | Zhang et al. |
| 7,593,378 | B1* | 9/2009 | Murali et al. ............ 370/338 |
| 7,624,267 | B2 | 11/2009 | Huang et al. |
| 7,649,872 | B2 | 1/2010 | Naghian et al. |
| 7,664,049 | B1 | 2/2010 | Arrakoski et al. |
| 7,680,079 | B2 | 3/2010 | Jeong et al. |
| 7,756,082 | B1 | 7/2010 | Dhamdhere |
| 7,757,076 | B2 | 7/2010 | Stewart et al. |
| 7,881,474 | B2 | 2/2011 | Sun |
| 7,903,817 | B2 | 3/2011 | Cam-Winget et al. |
| 7,929,460 | B2 | 4/2011 | Chen et al. |
| 7,933,247 | B2 | 4/2011 | Gidwani |
| 8,295,225 | B2 | 10/2012 | Ji et al. |
| 8,406,399 | B2 | 3/2013 | Loveland |
| 8,717,931 | B2 | 5/2014 | Kenichi et al. |
| 2001/0012757 | A1 | 8/2001 | Boyle |
| 2001/0024443 | A1 | 9/2001 | Alriksson et al. |
| 2002/0039367 | A1 | 4/2002 | Seppala et al. |
| 2002/0061750 | A1 | 5/2002 | Mohebbi |
| 2002/0080738 | A1 | 6/2002 | Kim et al. |
| 2002/0138635 | A1 | 9/2002 | Redlich et al. |
| 2002/0181447 | A1 | 12/2002 | Hashizume et al. |
| 2002/0198019 | A1 | 12/2002 | Naim et al. |
| 2003/0054796 | A1* | 3/2003 | Tamaki et al. ............ 455/406 |
| 2003/0068975 | A1* | 4/2003 | Qiao ............ H04W 88/04 455/11.1 |
| 2003/0087646 | A1 | 5/2003 | Funato et al. |
| 2003/0092444 | A1 | 5/2003 | Sengodan et al. |
| 2003/0095504 | A1 | 5/2003 | Ogier |
| 2003/0101263 | A1 | 5/2003 | Bouillet et al. |
| 2003/0103496 | A1 | 6/2003 | Lakshmi et al. |
| 2003/0103521 | A1 | 6/2003 | Raphaeli et al. |
| 2003/0123404 | A1 | 7/2003 | Kasapi et al. |
| 2003/0157951 | A1 | 8/2003 | Hasty, Jr. |
| 2003/0169697 | A1 | 9/2003 | Suzuki et al. |
| 2003/0198346 | A1 | 10/2003 | Meifu et al. |
| 2003/0202476 | A1 | 10/2003 | Billhartz et al. |
| 2003/0203741 | A1 | 10/2003 | Matsuo et al. |
| 2003/0212802 | A1 | 11/2003 | Rector et al. |
| 2003/0235174 | A1 | 12/2003 | Pichna et al. |
| 2004/0001442 | A1 | 1/2004 | Rayment et al. |
| 2004/0008663 | A1 | 1/2004 | Srikrishna et al. |
| 2004/0029528 | A1 | 2/2004 | Chandler |
| 2004/0068668 | A1 | 4/2004 | Lor et al. |
| 2004/0087268 | A1 | 5/2004 | Hatano |
| 2004/0090943 | A1 | 5/2004 | Da Costa et al. |
| 2004/0171386 | A1 | 9/2004 | Mitjana |
| 2004/0174822 | A1 | 9/2004 | Bui |
| 2004/0202120 | A1 | 10/2004 | Hanson |
| 2004/0203787 | A1 | 10/2004 | Naghian |
| 2004/0235452 | A1 | 11/2004 | Fischer |
| 2004/0235481 | A1* | 11/2004 | Shimizu ............ 455/445 |
| 2004/0266439 | A1 | 12/2004 | Lynch, Jr. et al. |
| 2005/0053005 | A1* | 3/2005 | Cain et al. ............ 370/235 |
| 2005/0053094 | A1 | 3/2005 | Cain et al. |
| 2005/0058109 | A1 | 3/2005 | Ekberg |
| 2005/0063359 | A1 | 3/2005 | Jagadeesan et al. |
| 2005/0088980 | A1 | 4/2005 | Olkkonen et al. |
| 2005/0094588 | A1 | 5/2005 | Wentink |
| 2005/0108527 | A1 | 5/2005 | Ginzburg et al. |
| 2005/0136834 | A1 | 6/2005 | Bonta et al. |
| 2005/0138671 | A1* | 6/2005 | Love et al. ............ 725/123 |
| 2005/0197098 | A1 | 9/2005 | Trossen |
| 2005/0228853 | A1 | 10/2005 | Yamamura et al. |
| 2005/0243719 | A1 | 11/2005 | Haverinen et al. |
| 2005/0254472 | A1 | 11/2005 | Roh et al. |
| 2005/0286476 | A1 | 12/2005 | Crosswy et al. |
| 2006/0005008 | A1 | 1/2006 | Kao |
| 2006/0007863 | A1 | 1/2006 | Naghian |
| 2006/0009248 | A1 | 1/2006 | Sakamoto et al. |
| 2006/0056368 | A1 | 3/2006 | Ratiu et al. |
| 2006/0064589 | A1 | 3/2006 | Taniguchi et al. |
| 2006/0092939 | A1 | 5/2006 | Duggi et al. |
| 2006/0098598 | A1 | 5/2006 | Gallagher |
| 2006/0101400 | A1 | 5/2006 | Capek et al. |
| 2006/0114825 | A1 | 6/2006 | McAuley et al. |
| 2006/0114850 | A1 | 6/2006 | Avinash et al. |
| 2006/0143026 | A1 | 6/2006 | Jagannathan et al. |
| 2006/0171348 | A1 | 8/2006 | Nokano et al. |
| 2006/0171403 | A1 | 8/2006 | Kim et al. |
| 2006/0176852 | A1 | 8/2006 | Wu et al. |
| 2006/0178149 | A1 | 8/2006 | Kamat et al. |
| 2006/0215576 | A1 | 9/2006 | Yu et al. |
| 2006/0217062 | A1* | 9/2006 | Saffre et al. ............ 455/11.1 |
| 2006/0221858 | A1 | 10/2006 | Switzer et al. |
| 2006/0227724 | A1 | 10/2006 | Thubert et al. |
| 2006/0229080 | A1 | 10/2006 | Khan et al. |
| 2006/0236105 | A1 | 10/2006 | Brok et al. |
| 2006/0240828 | A1* | 10/2006 | Jain et al. ............ 455/436 |
| 2006/0258391 | A1* | 11/2006 | Lee ............ 455/550.1 |
| 2006/0268767 | A1 | 11/2006 | Sato et al. |
| 2007/0008902 | A1 | 1/2007 | Yaramada et al. |
| 2007/0016262 | A1 | 1/2007 | Gross et al. |
| 2007/0038743 | A1 | 2/2007 | Hellhake et al. |
| 2007/0042769 | A1 | 2/2007 | Thommana et al. |
| 2007/0076875 | A1 | 4/2007 | Kaechi |
| 2007/0081477 | A1 | 4/2007 | Jakkahalli et al. |
| 2007/0097906 | A1 | 5/2007 | Kato |
| 2007/0110009 | A1 | 5/2007 | Bachmann et al. |
| 2007/0111705 | A1 | 5/2007 | Zhang et al. |
| 2007/0149139 | A1 | 6/2007 | Gauvreau |
| 2007/0172040 | A1 | 7/2007 | Cesarini et al. |
| 2007/0198656 | A1 | 8/2007 | Mazzaferri |
| 2007/0206527 | A1 | 9/2007 | Lo et al. |
| 2007/0217433 | A1 | 9/2007 | Doppler et al. |
| 2007/0220219 | A1 | 9/2007 | Bansal et al. |
| 2007/0223408 | A1 | 9/2007 | Thielke et al. |

(56) References Cited

U.S. PATENT DOCUMENTS

| | | | |
|---|---|---|---|
| 2007/0234061 A1 | 10/2007 | Teo | |
| 2007/0253376 A1 | 11/2007 | Bonta et al. | |
| 2007/0254614 A1 | 11/2007 | Muralidharan et al. | |
| 2007/0291722 A1 | 12/2007 | Lee | |
| 2008/0040481 A1 | 2/2008 | Joshi et al. | |
| 2008/0046542 A1 | 2/2008 | Sano | |
| 2008/0049689 A1* | 2/2008 | Nakfour et al. | 370/338 |
| 2008/0069105 A1* | 3/2008 | Costa et al. | 370/392 |
| 2008/0080387 A1 | 4/2008 | Wang et al. | |
| 2008/0081606 A1 | 4/2008 | Cole | |
| 2008/0081623 A1 | 4/2008 | Burgan et al. | |
| 2008/0089288 A1 | 4/2008 | Anschutz et al. | |
| 2008/0095114 A1 | 4/2008 | Dutta et al. | |
| 2008/0095134 A1 | 4/2008 | Chen et al. | |
| 2008/0112355 A1 | 5/2008 | Krishnakumar et al. | |
| 2008/0112362 A1 | 5/2008 | Korus | |
| 2008/0139239 A1* | 6/2008 | O'Connor | 455/552.1 |
| 2008/0146232 A1 | 6/2008 | Knisely | |
| 2008/0165735 A1 | 7/2008 | Chen et al. | |
| 2008/0165786 A1 | 7/2008 | Ahuja et al. | |
| 2008/0192666 A1* | 8/2008 | Koskan et al. | 370/311 |
| 2008/0254800 A1 | 10/2008 | Chun et al. | |
| 2008/0298284 A1 | 12/2008 | Dawson et al. | |
| 2009/0046598 A1 | 2/2009 | Krishnaswamy et al. | |
| 2009/0046644 A1 | 2/2009 | Krishnaswamy et al. | |
| 2009/0046658 A1 | 2/2009 | Krishnaswamy | |
| 2009/0046676 A1 | 2/2009 | Krishnaswamy et al. | |
| 2009/0046861 A1 | 2/2009 | Krishnaswamy | |
| 2009/0047930 A1 | 2/2009 | Krishnaswamy et al. | |
| 2009/0047964 A1 | 2/2009 | Krishnaswamy | |
| 2009/0047966 A1 | 2/2009 | Krishnaswamy et al. | |
| 2009/0049158 A1 | 2/2009 | Krishnaswamy et al. | |
| 2009/0073943 A1 | 3/2009 | Krishnaswamy et al. | |
| 2009/0125429 A1 | 5/2009 | Takayama | |
| 2009/0172391 A1 | 7/2009 | Kasapidis | |
| 2010/0034131 A1 | 2/2010 | Kasapi et al. | |
| 2010/0173631 A1 | 7/2010 | Kim et al. | |
| 2010/0202428 A1 | 8/2010 | Thompson et al. | |
| 2011/0019627 A1 | 1/2011 | Krishnaswamy et al. | |
| 2011/0026477 A1 | 2/2011 | Sinivaara et al. | |
| 2011/0039566 A1 | 2/2011 | Zee et al. | |
| 2011/0183685 A1 | 7/2011 | Burton et al. | |
| 2012/0027001 A1 | 2/2012 | Krishnaswamy et al. | |
| 2014/0241296 A1 | 8/2014 | Shattil | |

FOREIGN PATENT DOCUMENTS

| | | | |
|---|---|---|---|
| CN | 1435027 A | | 8/2003 |
| CN | 1602109 A | | 3/2005 |
| CN | 1736041 A | | 2/2006 |
| CN | 1741485 A | | 3/2006 |
| CN | 1747449 A | | 3/2006 |
| CN | 1921418 A | | 2/2007 |
| CN | 1929384 A | | 3/2007 |
| CN | 1961531 A | | 5/2007 |
| DE | 10208689 | | 9/2003 |
| DE | 1005021315 | | 12/2005 |
| EP | 1289200 | | 3/2003 |
| EP | 1445893 A2 | | 8/2004 |
| EP | 1458151 | | 9/2004 |
| EP | 1178644 B1 | | 7/2006 |
| EP | 1677462 A1 | | 7/2006 |
| EP | 1701486 | | 9/2006 |
| EP | 1761082 A1 | | 3/2007 |
| EP | 1775972 A1 | | 4/2007 |
| GB | 2398462 | | 8/2001 |
| GB | 2388276 | | 11/2003 |
| GB | 2408173 | | 5/2005 |
| JP | 2000115171 A | | 4/2000 |
| JP | 2001275145 A | | 10/2001 |
| JP | 2002510447 A | | 4/2002 |
| JP | 2002544727 A | | 12/2002 |
| JP | 2003070068 A | | 3/2003 |
| JP | 2003101553 A | | 4/2003 |
| JP | 2003143644 A | | 5/2003 |
| JP | 2003230167 A | | 8/2003 |
| JP | 2004153529 A | | 5/2004 |
| JP | 2004519911 A | | 7/2004 |
| JP | 2004253885 A | | 9/2004 |
| JP | 2004264976 A | | 9/2004 |
| JP | 2004320775 A | | 11/2004 |
| JP | 2005500766 A | | 1/2005 |
| JP | 2005502273 A | | 1/2005 |
| JP | 2005033808 A | | 2/2005 |
| JP | 2005117656 A | | 4/2005 |
| JP | 2005123781 A | | 5/2005 |
| JP | 2005176021 A | | 6/2005 |
| JP | 2005204213 A | | 7/2005 |
| JP | 2005523666 A | | 8/2005 |
| JP | 2005295310 A | | 10/2005 |
| JP | 2005531958 A | | 10/2005 |
| JP | 2005536131 A | | 11/2005 |
| JP | 2005341290 A | | 12/2005 |
| JP | 2005348397 A | | 12/2005 |
| JP | 2005536913 A | | 12/2005 |
| JP | 2006013811 A | | 1/2006 |
| JP | 2006502670 A | | 1/2006 |
| JP | 2006041633 A | | 2/2006 |
| JP | 2006050224 A | | 2/2006 |
| JP | 2006505987 A | | 2/2006 |
| JP | 2006074621 A | | 3/2006 |
| JP | 2006163793 A | | 6/2006 |
| JP | 2006197462 A | | 7/2006 |
| JP | 2006287426 A | | 10/2006 |
| JP | 2006304005 A | | 11/2006 |
| JP | 2007036828 A | | 2/2007 |
| JP | 2007037111 A | | 2/2007 |
| JP | 200750553 A | | 3/2007 |
| JP | 2007074382 A | | 3/2007 |
| JP | 2007508781 A | | 4/2007 |
| JP | 2007116710 A | | 5/2007 |
| JP | 2007129380 A | | 5/2007 |
| JP | 2007143066 A | | 6/2007 |
| JP | 2007522725 A | | 8/2007 |
| JP | 2007528162 A | | 10/2007 |
| JP | 2009500958 | | 1/2009 |
| JP | 2009500984 A | | 1/2009 |
| JP | 2009526418 A | | 7/2009 |
| JP | 4504934 | | 7/2010 |
| JP | 2010537575 | | 12/2010 |
| JP | 5335793 B2 | | 11/2013 |
| KR | 1020070034060 | | 3/2007 |
| RU | 2192049 C1 | | 10/2002 |
| RU | 2206177 C1 | | 6/2003 |
| RU | 2273050 C2 | | 3/2006 |
| RU | 2301444 | | 6/2007 |
| TW | I242937 B | | 11/2005 |
| TW | I243620 | | 11/2005 |
| TW | I246005 B | | 12/2005 |
| TW | I246344 B | | 12/2005 |
| WO | 9013211 | | 11/1990 |
| WO | 0069186 | | 11/2000 |
| WO | WO0199053 A2 | | 12/2001 |
| WO | 02063900 | | 8/2002 |
| WO | WO02063990 A1 | | 8/2002 |
| WO | WO02071084 A1 | | 9/2002 |
| WO | WO02096132 A1 | | 11/2002 |
| WO | 03017705 A1 | | 2/2003 |
| WO | WO03090847 A2 | | 11/2003 |
| WO | 2004002208 A2 | | 1/2004 |
| WO | WO2004004226 A1 | | 1/2004 |
| WO | 2004017549 A2 | | 2/2004 |
| WO | WO2004017568 A1 | | 2/2004 |
| WO | WO2004034219 A2 | | 4/2004 |
| WO | 2004043008 A1 | | 5/2004 |
| WO | WO2004107656 A1 | | 12/2004 |
| WO | WO2005036348 A2 | | 4/2005 |
| WO | 2005072183 A2 | | 8/2005 |
| WO | 2005086468 A1 | | 9/2005 |
| WO | WO2005088874 A1 | | 9/2005 |
| WO | WO2005109693 A1 | | 11/2005 |
| WO | WO2005116841 A1 | | 12/2005 |
| WO | WO2006000239 A1 | | 1/2006 |

(56) References Cited

FOREIGN PATENT DOCUMENTS

| WO | WO2006024343 A1 | 3/2006 |
|---|---|---|
| WO | 2006043902 | 4/2006 |
| WO | WO2006043901 | 4/2006 |
| WO | 2006068878 A1 | 6/2006 |
| WO | WO2006061682 A1 | 6/2006 |
| WO | WO2006117738 A1 | 11/2006 |
| WO | 2007004051 | 1/2007 |
| WO | 2007008751 A1 | 1/2007 |
| WO | WO2007008574 | 1/2007 |
| WO | WO2007024932 | 3/2007 |
| WO | 2007047118 A2 | 4/2007 |
| WO | 2007052249 | 5/2007 |
| WO | 2007064249 | 6/2007 |
| WO | WO2007090176 | 8/2007 |
| WO | WO2007091699 | 8/2007 |
| WO | 2008063728 | 5/2008 |
| WO | 2009026109 A1 | 2/2009 |
| WO | WO2009026192 | 2/2009 |
| WO | WO2010000870 A1 | 1/2010 |

OTHER PUBLICATIONS

Dimitriadis et al: "Seamless continuity of real-time video across umts and wlan networks: challenges and performance evaluation" IEEE Personal Communications, IEEE Communications Society, US, vol. 12, No. 3, Jun. 1, 2005, pp. 8-18, XP011134871.

Ashutosh et al.: "Seamless proactive handover across heterogeneous access networks" Wirless Personal Communciations, Kluwer Academic Publishers, DO, vol. 43, No. 3, Jun. 28, 2007, pp. 837-855, XP019557974.

Ming et al.: "Ad hoc assisted handoff for real-time voice in IEEE 802.11 infrastructure WLANs" Wireless Communications and Networks Conference, 2004. WCNC. 2004 IEEE Atlanta, GA, USA Mar. 21-25, 2004, Piscaraway, NJ, USA, IEEE, vol. 1, Mar. 21, 2004, pp. 202-206.

Bharat et al.: "Integrating Heterogeneous Wireless Technologies: A Cellular Aided Mobile Ad Hoc Network (CAMA)" Mobile Networks and Applications, Kluwer Academic Publishers, BO, vol. 9, No. 4, Aug. 1, 2004, pp. 393-408, XP019213788.

European, Search Report—EP08006428, European Search Authority—The Hague—Jan. 15, 2009.

International Search Report—PCT/US08/072866, International Search Authoroity—European Patent Office—Jan. 29, 2009.

Written Opinion—PCT/US08/072866, International Search Authroity—European Patent Office—Jan. 29, 2009.

Cradlepoint Technology, "CTR250 Mobile Broadband Travel Router: Ethernet, USB Modem Support", Dec. 2008.

Cradlepoint Technology, "CTR500 Mobile Broadband Router: Ethernet, USB, and ExpressCard Modem Support" Dec. 2008.

FON Wiki Beta, "Alien, Linus and Bill", http://wiki.fon.com/wiki/alien2%_linus_and_Bill,27, Feb. 2009.

FON Wiki Beta, "FON Spot", http://wiki.fon.com/wiki/FON_Spot—Apr. 6, 2009.

Kyocera, "KR1 Mobile Router: Technical Specifications" 2006 Kyocera Wireless Corp.—Feb. 2006.

Dilip Krishnaswamy: "AWiMA: An Architecture for Adhoc Wireless Mobile Internet Access" Global Telecommunications Conference, 2008, IEEE GLOBECOM 2008, Nov. 30, 2008, pp. 1-5, XP031370766 IEEE, Piscataway, NJ, USA ISBN: 978-1-4244-2324-8 abstract; figure p. 2, col. 1, paragraph 3-p. 3, col. 2, paragraph 3.3.2; figure 2.

Sengupta S et al: "Dynamic pricing for service provisioning and network selection in heterogeneous networks" Physical Communication, vol. 2, No. 1-2, 39-43 Mar. 1, 2009, pp. 138-150, XP026110196 ISSN: 1874-4907 [retrieved on Mar. 9, 2009] abstract.

Ying Qiu, Peter Marbach: "Bandwidth Allocation in Ad Hoc Networks: a Price-Based Approach" IEEE INFOCOM 2003, [Online] Jul. 3, 2003, pp. 1-11, XP002603370 INFOCOM 2003 Retrieved from the Internet: URL.http.//www.i eee-infocom.org/2003/papers/20_01.PDF> [retrieved on Oct. 4, 2010] p. 1, col. 1, line 9, paragraph 1-p. 4, col. 1, line 20, paragraph II. E p. 9, col. 2, line 5, VIII-p. 11, col. 1, line 18, paragraph IX.

Park, Mirang et al., "A Study of a Seamless User Authentication Protocol on Wireless LAN Systems," Journal of the Information Processing Society of Japan, The Information Processing Society of Japan, Jul. 15, 2006, 47(7), pp. 2058-2070.

Taiwan Search Report—TW097131329—TIPO—Sep. 3, 2012.

Steiner J.G., et al.,"Kerberos: An Authentication Service for Open Network Systems", Jan. 12, 1988, pp. 1-15.

\* cited by examiner

AD HOC SERVICE PROVIDER'S ABILITY TO PROVIDE SERVICE FOR A WIRELESS NETWORK

CLAIM OF PRIORITY UNDER 35 U.S.C. §119

The present Application for Patent claims priority to Provisional Application No. 60/956,658 entitled, "METHOD FOR A HETEROGENEOUS WIRELESS AD HOC MOBILE SERVICE PROVIDER" filed Aug. 17, 2007, and assigned to the assignee hereof and hereby expressly incorporated by reference herein.

BACKGROUND

1. Field

The present disclosure relates generally to telecommunications, and more specifically to an ad hoc service provider's ability to provide service for a wireless network.

2. Background

Wireless telecommunication systems are widely deployed to provide various services to consumers, such as telephony, data, video, audio, messaging, broadcasts, etc. These systems continue to evolve as market forces drive wireless telecommunications to new heights. Today, wireless networks are providing broadband Internet access to mobile subscribers over a regional, a nationwide, or even a global region. Such networks are sometimes referred as Wireless Wide Area Networks (WWANs). WWAN operators generally offer wireless access plans to their subscribers such as subscription plans at a monthly fixed rate.

Accessing WWANs from all mobile devices may not be possible. Some mobile devices may not have a WWAN radio. Other mobile devices with a WWAN radio may not have a subscription plan enabled. Ad hoc networking allows mobile devices to dynamically connect over wireless interfaces using protocols such as WLAN, Bluetooth, UWB, or other protocols. There is a need in the art for a methodology to allow a user of a mobile device without WWAN access to dynamically subscribe to wireless access service provided by a user with a WWAN-capable mobile device using wireless ad hoc networking between the mobile devices belong to the two users.

SUMMARY

In one aspect of the disclosure, an ad hoc service provider is provided for a wireless network. The ad hoc service provider includes a processing system configured to support a first wireless access protocol. The processing system is further configured to support a wireless access point for one or more mobile clients using a second wireless access protocol. In addition, the processing system is configured to alter the ad hoc service provider's ability to provide service for a wireless network in response to a resource related event.

In another aspect of the disclosure, an ad hoc service provider is provided for a wireless network. The ad hoc service provider includes means for supporting a first wireless access protocol and means for supporting a wireless access point for one or more mobile clients using a second wireless access protocol. The ad hoc service provider further includes means for altering the ad hoc service provider's ability to provide service for a wireless network in response to a resource related event.

In a further aspect of the disclosure, a method of providing service from a mobile node for a wireless network is described. The method includes sending a request that a mobile node be allowed to provide service as an ad hoc service provider. The method further includes detecting a resource related event of the mobile node for a wireless network, and altering the mobile node's ability to provide service for the wireless network.

In yet a further aspect of the disclosure, a machine-readable medium includes instructions executable by a processing system of a mobile node. The instructions include code for detecting a resource related event of a mobile node, and altering the mobile node's ability to provide service as an ad hoc service provider for a wireless network based on the detection.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

The detailed description set forth below in connection with the appended drawings is intended as a description of various configurations of the present invention and is not intended to represent the only configurations in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
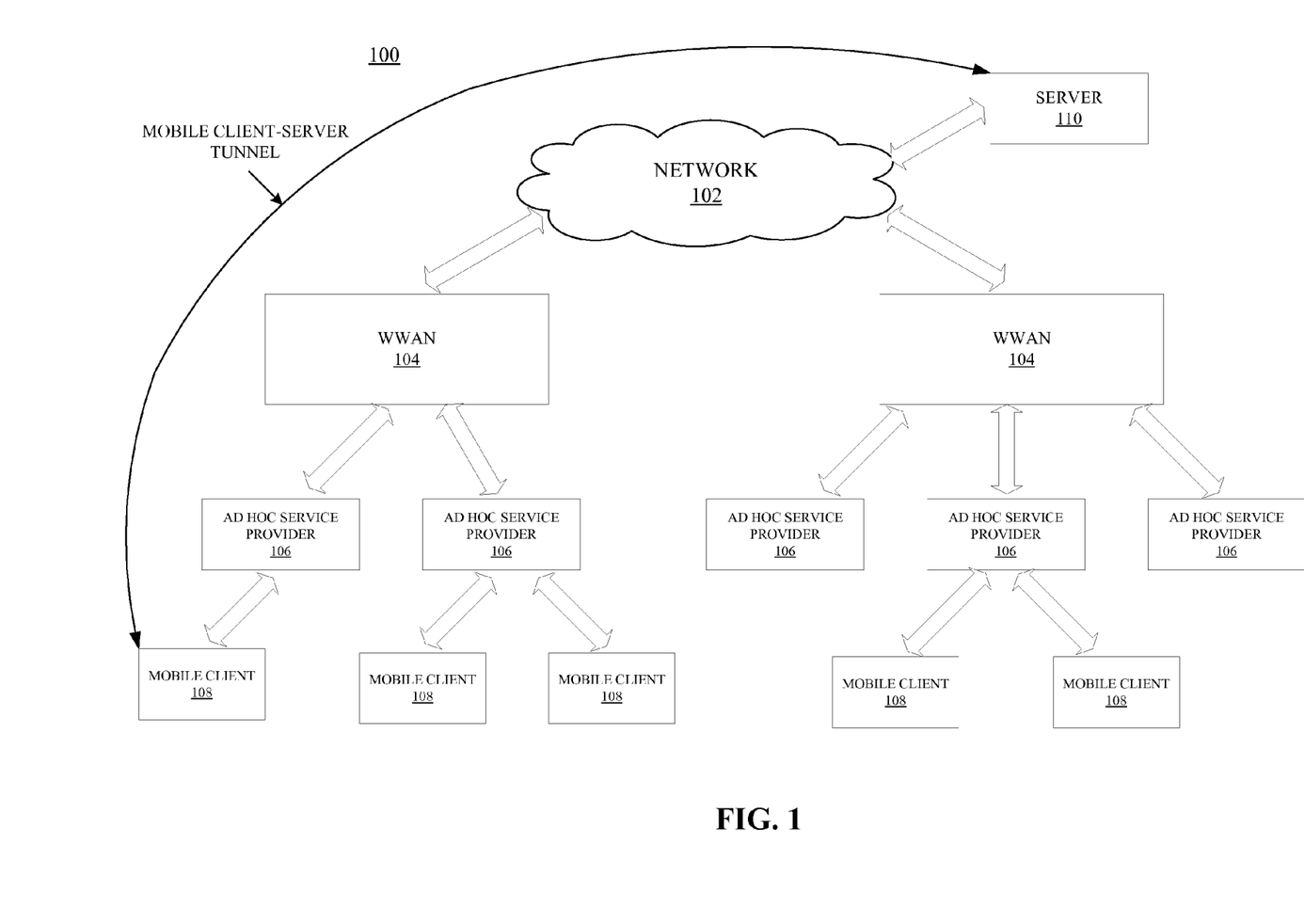
FIG. 1 is a conceptual block diagram illustrating an example of a telecommunications system.

FIG. 1 is a conceptual block diagram illustrating an example of a telecommunications system. The telecommunications system 100 is shown with multiple WWANs 104 that provide broadband access to a network 102 for mobile subscribers. The network 102 may be a packet-based network such as the Internet or some other suitable network. For clarity of presentation, two WWANs 104 are shown with a backhaul connection to the network 102. However, the number of WWANs providing broadband access to the network 102 is not limited to two WWANs. Each WWAN 104 may be implemented with multiple fixed-site base stations (not shown) dispersed throughout a geographic region. The geographic region may be generally subdivided into smaller regions known as cells. Each base station may be configured to serve all mobile subscribers within its respective cell. A base station controller (not shown) may be used to manage and coordinate the base stations in the WWAN 104 and support the backhaul connection to the network 102.

Each WWAN 104 may use one of many different wireless access protocols to support radio communications with mobile subscribers. By way of example, one WWAN 104 may support Evolution-Data Optimized (EV-DO), while the other WWAN 104 may support Ultra Mobile Broadband (UMB). EV-DO and UMB are air interface standards promulgated by the 3rd Generation Partnership Project 2 (3GPP2) as part of the CDMA2000 family of standards and employ multiple access techniques such as Code Division Multiple Access (CDMA) to provide broadband Internet access to mobile subscribers. Alternatively, one of the WWANs 104 may support Long Term Evolution (LTE), which is a project within the 3GPP2 to improve the Universal Mobile Telecommunications System (UMTS) mobile phone standard based primarily on a Wideband CDMA (W-CDMA) air interface. One of the WWANs 104 may also support the WiMAX standard being developed by the WiMAX forum. The actual wireless access protocol employed by a WWAN for any particular telecommunications system will depend on the specific application and the overall design constraints imposed on the system. The various techniques presented throughout this disclosure are equally applicable to any combination of heterogeneous or homogeneous WWANs regardless of the wireless access protocols utilized.

Each WWAN 104 has a number of mobile subscribers. Each subscriber may have a mobile node capable of accessing the network 102 directly through the WWAN 104. In the telecommunications system shown in FIG. 1, these mobile nodes access the WWANs 104 using an EV-DO, UMB or LTE wireless access protocol; however, in actual implementations, these mobile nodes may be configured to support any wireless access protocol.

One or more of the mobile nodes may be configured to create in its vicinity an ad hoc network based on the same or a different wireless access protocol used to access the WWAN(s) 104. By way of example, a mobile node may support a UMB wireless access protocol with a WWAN, while providing an IEEE 802.11 access point for other mobile nodes that cannot directly access a WWAN. IEEE 802.11 denotes a set of Wireless Local Access Network (WLAN) standards developed by the IEEE 802.11 committee for short-range communications (e.g., tens of meters to a few hundred meters). Although IEEE 802.11 is a common WLAN wireless access protocol, other suitable protocols may be used.

A mobile node that may be used to provide an access point for another mobile node will be referred to herein as an "ad hoc service provider" and is represented as an ad hoc service provider 106 in FIG. 1. A mobile node that may use an access point of an ad hoc service provider 106 will be referred to herein as a "mobile client" and is represented as a mobile client 108 in FIG. 1. A mobile node, whether an ad hoc service provider 106 or a mobile client 108, may be a laptop computer, a mobile telephone, a personal digital assistant (PDA), a mobile digital audio player, a mobile game console, a digital camera, a digital camcorder, a mobile audio device, a mobile video device, a mobile multimedia device, a component of any of the foregoing (such as an integrated circuit included in or to be included in any of the foregoing), or any other device capable of supporting at least one wireless access protocol.

The ad hoc service provider 106 may extend its wireless broadband network access service to mobile clients 108 that would otherwise not have access to the network 102. A server 110 may be used as an "exchange" to enable mobile clients 108 to purchase unused bandwidth from ad hoc service providers 106 to access, for example, the network 102 across the WWANs 104.

An ad hoc service provider 106, a server 110, and one or more mobile clients 108 may establish a network that is an ad hoc heterogeneous wireless network. By way of example, a heterogeneous wireless network may include at least two types of wireless networks (e.g., a WWAN and a WLAN). By way of example, an ad hoc network may be a network whose specific configuration may change from time to time or from the formation of one network to the next. The network configuration is not pre-planned prior to establishing the network. Examples of configurations for an ad hoc network may include a configuration as to which members are to be in the network (e.g., which ad hoc service provider, which server, and/or which mobile client(s) are to be included in a network), a configuration as to the geographic locations of an ad hoc service provider and mobile client(s), and a configuration as to when and how long a network is to be established.

For illustrative purposes only, exemplary scenarios of ad hoc networks are described below. Scenario 1: While a mobile subscriber is at an airport on Tuesday 8 am, he may turn on his mobile node (e.g., a laptop computer or a mobile telephone), use it as an ad hoc service provider while he is waiting for his flight, and establish an ad hoc network for 30 minutes. The ad hoc network may include one or more mobile clients (e.g., other laptop computers or mobile telephones) in the vicinity. Scenario 2: On Wednesday 5 pm, while the mobile subscriber is at a hotel, he may use the same mobile node as an ad hoc service provider to form another ad hoc network for four hours, providing its service to the same mobile clients, different mobile clients, or a combination of both. Scenario 3: On Wednesday 5 pm, a different ad hoc service provider may form an ad hoc network at the airport where the first ad hoc service provider was the day before. Because the service providers and clients are mobile, an ad hoc network can be a "mobile" network.

The server 110 may be a centralized server or a distributed server. The centralized server may be a dedicated server or integrated into another entity such as a desktop or laptop computer, or a mainframe. The distributed server may be distributed across multiple servers and/or one or more other entities such as laptops or desktop computers, or mainframes. In at least one configuration, the server 110 may be integrated, either in whole or in part, into one or more ad hoc service providers.

In one configuration of a telecommunications system 100, the server 110 charges the mobile clients 108 based on usage. For the occasional user of mobile Internet services, this may be an attractive alternative to the monthly fixed rate wireless access plans. The revenue generated from the usage charges may be allocated to the various entities in the telecommunications system 100 in a way that tends to perpetuate the vitality of the exchange. By way of example, a portion of the revenue may be distributed to the ad hoc service providers, thus providing a financial incentive for mobile subscribers to become ad hoc service providers. Another portion of the revenue may be distributed to the WWAN operators to compensate them for the bandwidth that would otherwise go unutilized. Another portion of the revenue may be distributed to the manufacturers of the mobile nodes. The remainder of the revenue could be kept by the server operator that provides the exchange. The server 110, which may be a centralized server as shown or a distributed server including multiple servers, may be used to determine how to allocate revenue generated from the mobile clients 108 to the various entities in the telecommunications system 100.

The server 110 may be implemented as a trusted server. It can therefore be authenticated, for example, using a Public Key Infrastructure (PKI) certificate in a Transport Layer Security (TLS) session between the server 110 and an ad hoc service provider 106, or between the server 110 and a mobile client 108. Alternatively, the server 110 may be authenticated using self-signed certificates or by some other suitable means.

Regardless of the manner in which the server 110 is authenticated, a secure session channel may be established between the server 110 and an ad hoc service provider 106, or between the server 110 and a mobile client 108, during registration. In one configuration of a telecommunications system 100, a mobile client 108 may register with the server 110 to set up a user name and password with payment information. An ad hoc service provider 106 may register with the server 110 to notify its desire to provide a wireless access point to the network 102 (e.g., an Internet access point) to mobile clients 108.

The server 110 may also be used to provide admission control. Admission control is the process whereby the server 110 determines whether to allow an ad hoc service provider 106 to provide service within a geographic location. The server 110 may limit the number of ad hoc service providers 106 at a given location if it determines that additional ad hoc service providers 106 will adversely affect performance in the WWAN. Additional constraints may be imposed by the WWAN operators that may not want its mobile subscribers to provide service in a given geographic location depending on various network constraints.

The server 110 may also be used to manage dynamic sessions that are established between the ad hoc service providers 106 and the mobile clients 108. In one configuration of the telecommunications system 100, Extensible Authentication Protocol-Tunneled Transport Layer Security (EAP-TTLS) may be used for Authentication, Authorization and Accounting (AAA) and secure session establishment for a connection initiated by an ad hoc service provider 106 with the server 110 when the ad hoc service provider 106 is mobile and desires to provide service. EAP-TTLS may also be used for a session initiation request by a mobile client 108. In the latter case, the mobile client is the supplicant, the ad hoc service provider 106 is the authenticator, and the server 110 is the authentication server. The ad hoc service provider 106 sends the mobile client's credentials to the server 110 for EAP-AAA authentication. The EAP-TTLS authentication response from the server 110 is then used to generate a Master shared key. Subsequently, a link encryption key may be established between the ad hoc service provider 106 and the mobile client 108.

Additional security may be achieved with a Secure Sockets Layer Virtual Private Network (SSL VPN) tunnel between a mobile client 108 and the server 110. The SSL VPN tunnel is used to encrypt traffic routed through an ad hoc service provider 106 to provide increased privacy for a mobile client 108. Alternatively, the tunnel may be an IPsec tunnel or may be implemented using some other suitable tunneling protocol.

Once the tunnel is established between the server 110 and the mobile client 108, various services may be provided. By way of example, the server 110 may support audio or video services to the mobile client 108. The server 110 may also support advertising services to the mobile client 108. Other functions of the server 110 include providing routing to and from the network for mobile client 108 content as well as providing network address translation to and from the network for the mobile client 108.

The server 110 may also provide support for a handoff of a mobile client 108 from one ad hoc service provider 106 to another based on any number of factors. These factors may include, by way of example, the quality of service (QoS) required by each mobile client 108, the duration of the session required by each mobile client 108, and the loading, link conditions, and energy level (e.g., battery life) at the ad hoc service provider 106.

The server 110 may also be used to store a quality metric for each ad hoc service provider 106. This quality metric may be provided to the mobile clients 108 who may want to choose from available ad hoc service providers 106. This metric may be continuously updated as more information becomes available about a specific ad hoc service provider 106. The quality metric associated with each ad hoc service provider 106 may be decreased or increased based on the QoS provided.

Figure 2:
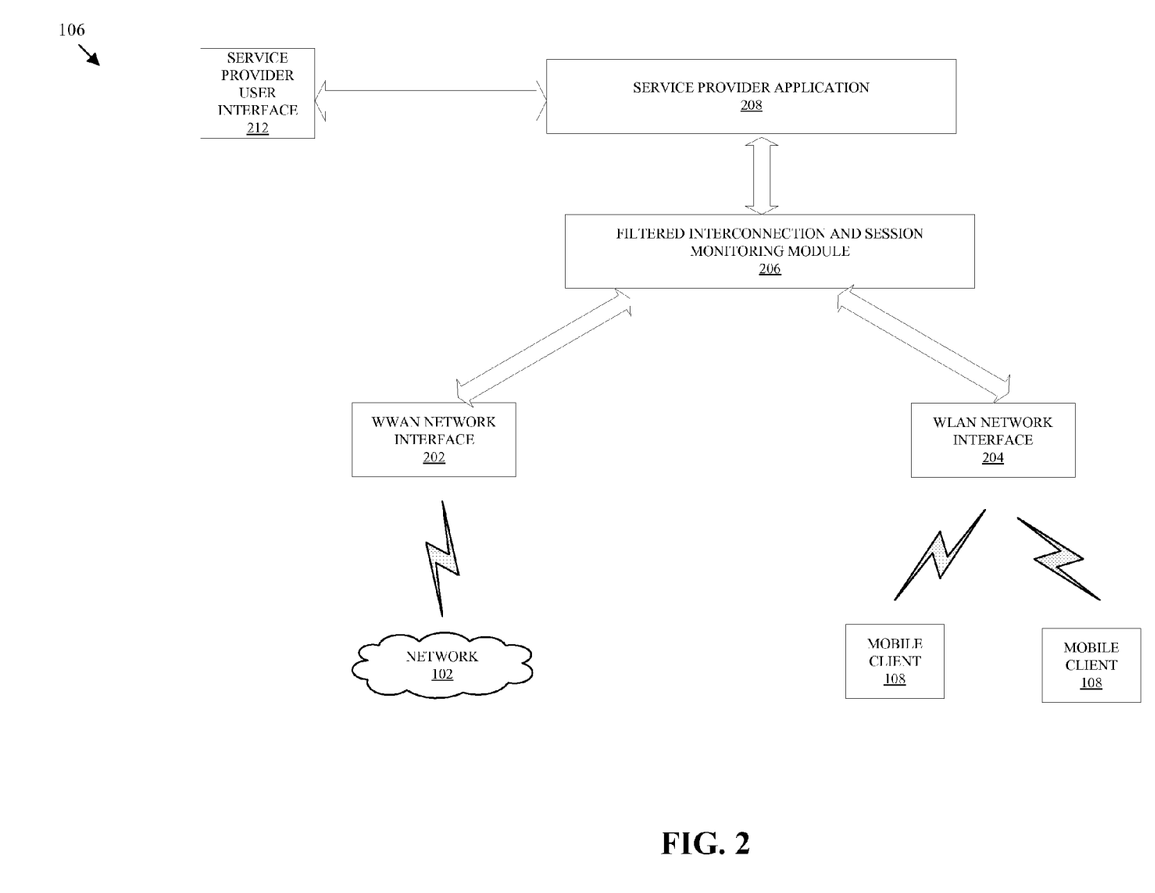
FIG. 2 is a conceptual block diagram illustrating an example of the functionality of an ad hoc service provider.

FIG. 2 is a conceptual block diagram illustrating an example of the functionality of an ad hoc service provider 106. The ad hoc service provider 106 has the ability to bridge wireless links over homogeneous or heterogeneous wireless access protocols. This may be achieved with a WWAN network interface 202 that supports a wireless access protocol for a WWAN 104 to the network 102, and a WLAN network interface 204 that provides a wireless access point for mobile clients 108. By way of example, the WWAN network interface 202 may include a transceiver function that supports EV-DO for network access through a WWAN 104, and the WLAN network interface 204 may include a transceiver function that provides an 802.11 access point for mobile clients 108. Each network interface 202, 204 may be configured to implement the physical layer by demodulating wireless signals and performing other radio frequency (RF) front end processing. Each network interface 202, 204 may also be configured to implement the data link layer by managing the transfer of data across the physical layer.

The ad hoc service provider 106 is shown with a filtered interconnection and session monitoring module 206. The module 206 provides filtered processing of content from mobile clients 108 so that the interconnection between the ad hoc wireless links to the WWAN network interface 202 is provided only to mobile clients 108 authenticated by the server. The module 206 is also responsible for monitoring the sessions between the server and the authenticated mobile clients 108. The module 206 may also maintain tunneled connectivity between the server and the authenticated mobile clients 108.

The ad hoc service provider 106 also includes a service provider application 208 that (1) enables the module 206 to provide ad hoc services to mobile clients 108, and (2) supports WWAN or Internet access to a mobile subscriber or user of the ad hoc service provider 106. The latter function is supported by a service provider user interface 212 that communicates with the WWAN network interface 202 through the module 206 under control of the service provider application 208. The user interface 212 may include a keypad, display, speaker, microphone, joystick, and/or any other combination of user interface devices that enable a mobile subscriber or user to access the WWAN 104 or the network 102 (see FIG. 1).

As discussed above, the service provider application 208 also enables the module 206 to provide ad hoc services to mobile clients 108. The service provider application 208 maintains a session with the server 110 to exchange custom messages with the server 110. In addition, the service provider application 208 maintains a separate session with each mobile client 108 for exchanging custom messages between the service provider application 208 and the mobile client 108. The service provider application 208 provides information on authenticated and permitted clients to the filtered interconnection and session monitoring module 206. The filtered interconnection and session monitoring module 206 allows content flow for only authenticated and permitted mobile clients 108. The filtered interconnection and session monitoring module 206 also optionally monitors information regarding content flow related to mobile clients 108 such as the amount of content outbound from the mobile clients 108 and inbound to the mobile clients 108, and regarding WWAN and WLAN network resource utilization and available bandwidths on the wireless channels. The filtered interconnection and session monitoring module 206 can additionally and/or optionally provide such information to the service provider application 208. The service provider application 208 can additionally and/or optionally act on such information and take appropriate actions such as determining whether to continue maintaining connectivity with the mobile clients 108 and with the server 110, or whether to continue to provide service. It should be noted that the functions described in connection with the module 206 and the service provider application 208 can be implemented in any given platform in one or multiple sets of modules that coordinate to provide such functionality at the ad hoc service provider 106.

When the ad hoc service provider 106 decides to provide the ad hoc services, the service provider application 208 sends a request to the server 110 for approval. The service provider application 208 requests authentication by the server 110 and approval from the server 110 to provide service to one or more mobile clients 108. The server 110 may authenticate the ad hoc service provider 106 and then determine whether it will grant the ad hoc service provider's request. As discussed earlier, the request may be denied, for example, if the number of ad hoc service providers in the same geographic location is too great or if the WWAN operator has imposed certain constraints on the ad hoc service provider 106.

Once the ad hoc service provider 106 is authenticated, the service provider application 208 may advertise service information, such as an ad hoc WLAN Service Set Identifier (SSID), the cost of service, the duration of service, the availability of the ad hoc service provider, and a quality metric for the ad hoc service provider. The service provider application 208 may also prompt changes to the advertised service information as conditions change. Interested mobile clients 108 may associate with the SSID to access the ad hoc service provider 106. The service provider application 208 may then route authentication messages between the mobile clients 108 with the server 110 and configure the filtered interconnection and session monitoring module 206 to connect the mobile clients 108 to the server once authenticated. During the authentication of a mobile client 108, the service provider application 208 may use an unsecured wireless link.

The service provider application 208 may additionally and/or optionally choose to move a mobile client 108 to a new SSID with a secure link once the mobile client 108 is authenticated. In such situations, the service provider application 208 may distribute the time it spends in each SSID depending on the load that it has to support for existing sessions with mobile clients 108.

The service provider application 208 may also be able to determine whether it can support a mobile client 108 before allowing the mobile client 108 to access a network. Resource intelligence may be used to estimate the drain on the battery power, the QoS requirements, bandwidth requirements, latency requirements, processing requirements, required network access time, and/or other processing resources that may be required by accepting a mobile client 108 and may assist in determining whether the service provider application 208 should consider supporting a new mobile client 108 or accepting a handoff of that mobile client 108 from another ad hoc service provider 106.

The service provider application 208 may admit mobile clients 108 and provide them with a certain QoS guarantee, such as an expected average bandwidth during a session. Average throughputs provided to each mobile client 108 over a time window may be monitored. The service provider application 208 may monitor the throughputs for all flows going through it to ensure that resource utilization by the mobile clients 108 is below a certain threshold, and that it is meeting the QoS requirement that it has agreed to provide to the mobile clients 108 during the establishment of the session.

The service provider application 208 may also provide a certain level of security to the wireless access point by routing content through the filtered interconnection and session monitoring module 206 without being able to decipher the content. Similarly, the service provider application 208 may be configured to ensure content routed between the user interface 212 and the WWAN 104 via the module 206 cannot be deciphered by mobile clients 108. The service provider application 208 may use any suitable encryption technology to implement this functionality.

The service provider application 208 may also maintain a time period for a mobile client 108 to access a network. The time period may be agreed upon between the service provider application 208 and the mobile client 108 during the initiation of the session. If the service provider application 208 determines that it is unable to provide the mobile client 108 with access to the network for the agreed upon time period, then it may notify both the server 110 and the mobile client 108 regarding its unavailability. This may occur due to energy constraints (e.g., a low battery), or other unforeseen events. The server 110 may then consider a handoff of the mobile client 108 to another ad hoc service provider 106, if there is such an ad hoc service provider in the vicinity of the mobile client 108. The service provider application 208 may support the handoff of the mobile client 108.

The service provider application 208 may also dedicate processing resources to maintain a wireless link or limited session with mobile clients 108 served by other ad hoc service providers 106. These mobile clients 108 may be pre-authenticated by routing authentication messages to and from the server 110. This may facilitate the handoff of mobile clients 108 to the ad hoc service provider 106.

The service provider application 208 may manage the mobile client 108 generally, and the session specifically, through the user interface 212. Alternatively, the service provider application 208 may support a seamless operation mode with processing resources being dedicated to servicing mobile clients 108. In this way, the mobile client 108 is managed in a way that is transparent to the mobile subscriber of the ad hoc service provider. The seamless operation mode may be desired where the mobile subscriber does not want to be managing mobile clients 108, but would like to continue generating revenue by sharing bandwidth with mobile clients 108.

Although not shown, the ad hoc service provider 106 may also include a server application. The server application may be used to enable the ad hoc service provider 106 to function as a server to authenticate mobile clients 108.

Figure 3:
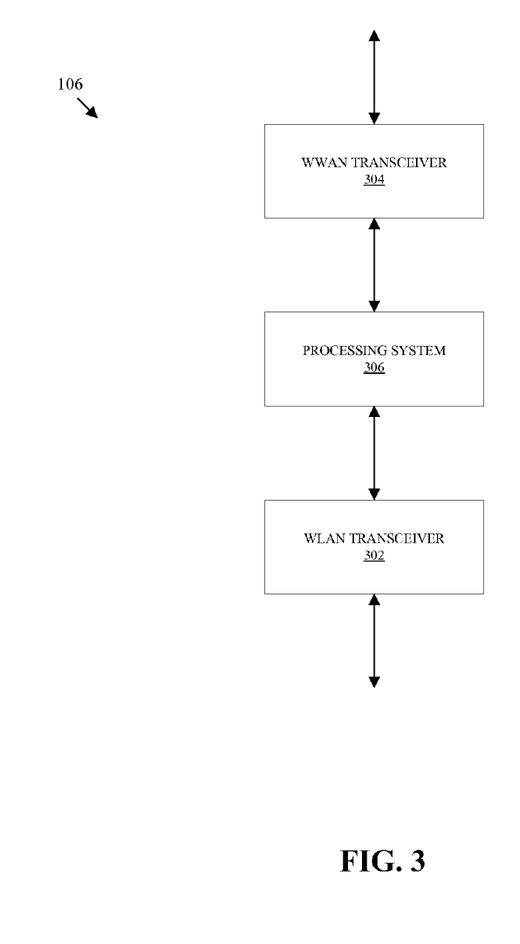
FIG. 3 is a conceptual block diagram illustrating an example of a hardware configuration for an ad hoc service provider.

FIG. 3 is a conceptual block diagram illustrating an example of a hardware configuration for an ad hoc service provider. The ad hoc service provider 106 is shown with a WLAN transceiver 302, a WWAN transceiver 304, and a processing system 306. By way of example, the WLAN transceiver 302 may be used to implement the analog portion of the physical layer for the WLAN network interface 204 (see FIG. 2), and the WWAN transceiver 304 may be used to implement the analog portion of the physical layer for the WWAN network interface 202 (see FIG. 2).

The processing system 306 may be used to implement the digital processing portion of the physical layer, as well as the link layer, for both the WLAN and the WWAN network interfaces 204 and 202 (see FIG. 2). The processing system 306 may also be used to implement the filtered interconnection and session monitoring module 206 and the service provider application 208 (see FIG. 2).

The processing system 306 may be implemented using software, hardware, or a combination of both. By way of example, the processing system 306 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The processing system 306 may also include one or more machine-readable media for storing software. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media may include storage integrated into a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 306. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a mobile node or a server or by a processing system of a mobile node or a server. Instructions can be, for example, a computer program including code.

Turning now to the mobile client in FIG. 1, a TLS session may be used by the mobile client 108 to register with the server 110. Once registered, the mobile client 108 may search for available ad hoc service providers 106. When the mobile client 108 detects the presence of one or more ad hoc service providers 106, it may initiate a session using EAP-TTLS with an ad hoc service provider 106 based on attributes and parameters such as the available bandwidth that the ad hoc service provider 106 can support, the QoS metric of the ad hoc service provider 106, and the cost of the service advertised. As described earlier, a link encryption key may be established between the mobile client 108 and the ad hoc service provider 106 during the establishment of the session. An SSL VPN session may be established between the mobile client 108 and the server 110 so that all traffic between the two is encrypted. The transport layer ports may be kept in the open and not encrypted to provide visibility for the network address translation functionality at the ad hoc service provider 106.

A handoff of a mobile client 108 from one ad hoc service provider to another may occur due to any of a number of factors. The handoff of the mobile client 108 may be performed in a variety of ways. In one configuration, the mobile client 108 may maintain a limited session with multiple ad hoc service providers 106, while using one ad hoc service provider 106 to access the Internet. As described earlier, this approach may facilitate the handoff process. In an alternative configuration, the mobile client 108 may consider a handoff only when necessary. In this configuration, the mobile client 108 may maintain an active list of ad hoc service providers 106 in its vicinity for handoff. The mobile client 108 may select an ad hoc service provider 106 for handoff from the active list when the current ad hoc service provider 106 needs to discontinue its service. When handoff is not possible, a mobile client 108 may need to reconnect through a different ad hoc service provider 106 to access the Internet.

If the bandwidth needs of a mobile client 108 are greater than the capabilities of the available ad hoc service providers 106, then the mobile client 108 may access multiple ad hoc service providers 106 simultaneously. A mobile client 108 with multiple transceivers could potentially access multiple ad hoc service providers 106 simultaneously using a different transceiver for each ad hoc service provider 106. If the same wireless access protocol can be used to access multiple ad hoc service providers 106, then different channels may be used. If the mobile client 108 has only one transceiver available, then it may distribute the time that it spends accessing each ad hoc service provider 106.

Referring back to FIGS. 1 and 3, resource intelligence on an ad hoc service provider is described in detail below. An ad hoc service provider 106 may include a network-aware platform-aware resource intelligence to manage the ad hoc service provider's ability to provide service for a wireless network that may include the ad hoc service provider 106, a server 110, and one or more of the mobile clients 108. The server 110 may be a single server or multiple servers. The wireless network may be an ad hoc heterogeneous wireless network including at least two types of wireless networks.

The processing system 306 of the ad hoc service provider 106 may be configured to support a first wireless access protocol (e.g., a wireless access protocol for the WWAN) to communicate with, for example, the WWAN 104, the network 102, and the server 110. It may also be configured to support a wireless access point for one or more of the mobile clients 108 using a second wireless access protocol (e.g., a wireless access protocol for the WLAN). In addition, the processing system 106 may be configured to alter the ad hoc service provider's ability to provide service for a wireless network in response to a resource related event.

The ad hoc service provider 106 may include a first wireless transceiver (e.g., the WWAN transceiver 304) to support a first wireless link using the first wireless access protocol and a second wireless transceiver (e.g., the WLAN transceiver 302) to support a second wireless link using the second wireless access protocol. The processing system may be further configured to support the wireless access point by bridging the second wireless link with the one or more mobile clients to the first wireless link.

The first wireless access protocol (e.g., EV-DO) may be different from the second wireless access protocol (e.g., IEEE 802.11). In an alternate configuration, the first and second wireless access protocols may be the same, regardless of whether the network includes two different types of wireless networks, for example, a WWAN and a WLAN.

The resource related events may include, by way of example, an indication that the ad hoc service provider's energy level (e.g., battery life of the ad hoc service provider) is below an energy threshold and an indication that the loading on the processing system 306 (e.g., loading due to processing/communications/actions internal or external to the ad hoc service provider) is above a loading threshold. The resource related events may also include an indication that an available bandwidth for communications utilizing the first wireless access protocol (e.g., communications with the WWAN 104, the network 102, and/or the server 110) is below a first bandwidth threshold or that an available bandwidth for communications utilizing the wireless access point (e.g., communications with the mobile clients 108) is below a second bandwidth threshold. In one example, the resource related events include all of the indications described in this paragraph. In another example, the resource related events include only one of the indications described in this paragraph. In yet another example, the resource related events include some of the indications described in this paragraph. In yet another example, the resource related events include other indication(s) in conjunction with any one or more of the above-described indications.

In response to detecting a resource related event, the ad hoc service provider 106 (or the processing system 306) may perform one or more of the following exemplary actions: (a) not admit any new mobile clients into the wireless network; (b) initiate a handoff of some or all of the existing mobile clients of the ad hoc service provider to other one or more ad hoc service providers; (c) terminate the ad hoc service provider's service being provided to some or all of the existing mobile clients (by way of illustration, shutting down the ad hoc service provider will terminate the service being provided to all of the existing mobile clients); (d) alter one or more attributes of the ad hoc service provider's service such as a data rate of the service or the duration of the service; (e) perform some other action(s); (f) perform no action; or (g) notify some or all of the mobile clients 108 and the server 110 an action that the ad hoc service provider 106 plans to take in response to the detection of the resource related event, where the action can be one or more of the actions described in (a)-(f) of this paragraph.

The ad hoc service provider 106 (or the processing system 306) may take a different action with respect to each of the existing mobile clients and the server 110, or notify a different action to each of the existing mobile clients and the server 110. Alternatively, the ad hoc service provider 106 (or the processing system 306) may take the same action with respect to each or some of the existing mobile clients and the server 110, or notify the same action to each or some of the existing mobile clients and the server 110. By way of illustration, as for the actions described in (d), the ad hoc service provider may alter the data rate of its service provided to one or more of the existing mobile clients. In addition or alternatively, the ad hoc service provider may alter the duration of the service provided to one or more of the existing mobile clients. Each mobile client (or some mobile clients) may have the same or different data rates, and the ad hoc service provider may change the data rate(s) the same way or differently for each of the mobile clients (or for some of the mobile clients). Furthermore, each mobile client (or some mobile clients) may have the same or different duration of service, and the ad hoc service provider may change the duration the same way or differently for each of the mobile clients (or for some of the mobile clients).

Figure 4A:
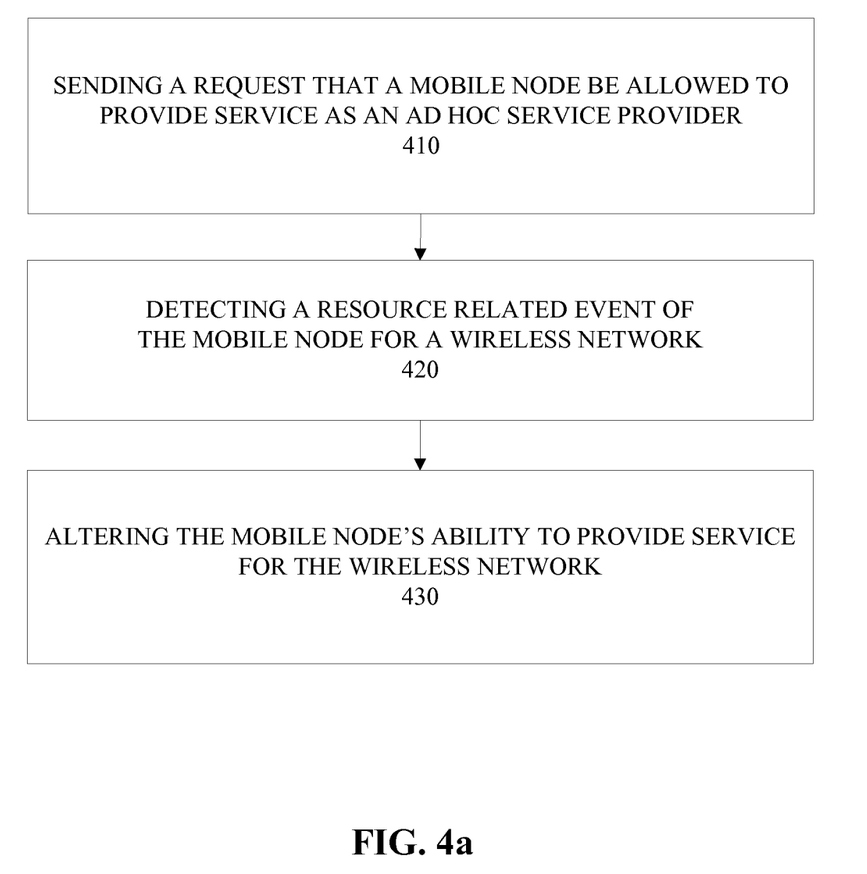
FIG. 4a is a flow chart illustrating an exemplary method of providing service from a mobile node for a wireless network.

FIG. 4a is a flow chart illustrating an exemplary method of providing service from a mobile node for a wireless network. In step 410, a request is sent that the mobile node be allowed to provide service as an ad hoc service provider. This step may comprise sending to a server from the mobile node a request that the mobile node be allowed to provide service as an ad hoc service provider for the wireless network. In step 420, a resource related event of the mobile node for a wireless network is detected. This step may comprise detecting at the mobile node a resource related event of the mobile node. In step 430, the mobile node's ability to provide service for the wireless network is altered. This step may comprise altering at the mobile node the mobile node's ability to provide service for the wireless network in response to the step of detecting.

According to one aspect of the disclosure, the mobile node may comprise a user interface, and this may enable a user to access the wireless network through the user interface. The mobile node may be configured to support a first wireless access protocol and a second wireless access protocol, and the first wireless access protocol may be different from the second wireless access protocol.

Figure 4B:
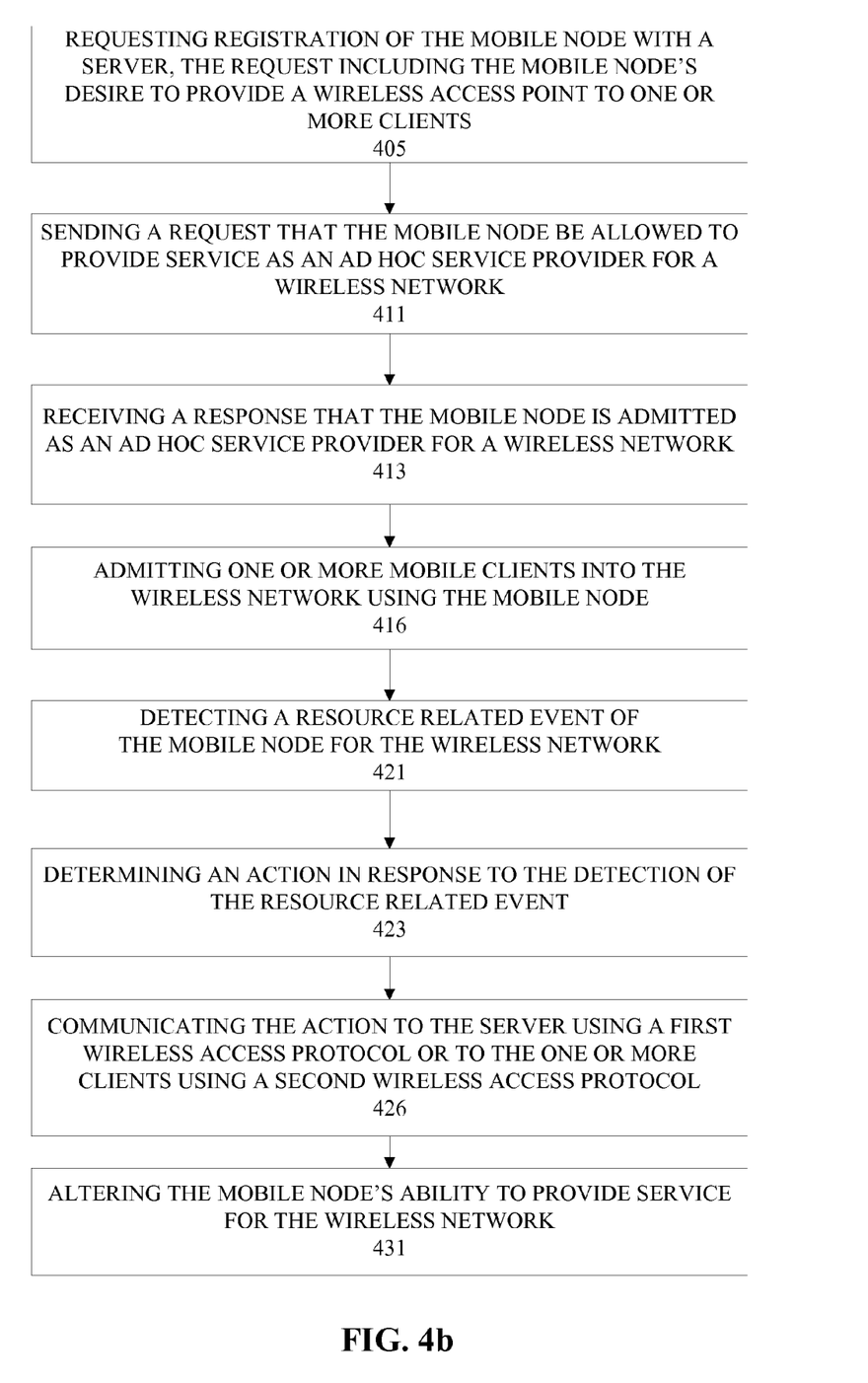
FIG. 4b is a flow chart illustrating another exemplary method of providing service from a mobile node for a wireless network.

FIG. 4b is a flow chart illustrating another exemplary method of providing service from a mobile node (e.g., an ad hoc service provider 106 in FIG. 1) for a wireless network. In step 405, the mobile node requests its registration with a server 110 of FIG. 1. The request includes the mobile node's desire to provide a wireless access point to one or more of the mobile clients 108 in FIG. 1. One or more of the mobile clients 108 may have been also registered with the server 110. After the mobile node is registered with the server, in step 411, the mobile node sends a request to the server 110 that the mobile node be allowed to provide service as an ad hoc service provider for a wireless network. This request may be to provide service for a wireless network within a geographic location. After step 411, in step 413, the mobile node receives a response from the server 110 that the mobile node is admitted as an ad hoc service provider for a wireless network.

In step 416, the mobile node admits one or more of the mobile clients 108 into the wireless network. This occurs after step 411. The mobile node may admit the mobile clients seamlessly without the mobile subscriber at the mobile node managing one or more of the mobile clients. After step 411, in step 421, the mobile node detects a resource related event of the mobile node for the wireless network. Step 421 may be performed automatically without the intervention from the mobile subscriber of the mobile node. In step 423, the mobile node determines an action in response to the detection of the resource related event. In step 426, the mobile node communicates the action to the server 110 using a first wireless access protocol or to one or more of the mobile clients 108 using a second wireless access protocol. In step 431, the mobile node alters its ability to provide service for the wireless network. The mobile node thus may alter its availability to some or all of the server 110 and the mobile clients 108 in response to the resource related event. Step 431 may be performed automatically without the intervention from the mobile subscriber of the mobile node. The processing system 306 in FIG. 3 may perform the various activities described with reference to FIGS. 4a and 4b or may initiate these activities.

Figure 5:
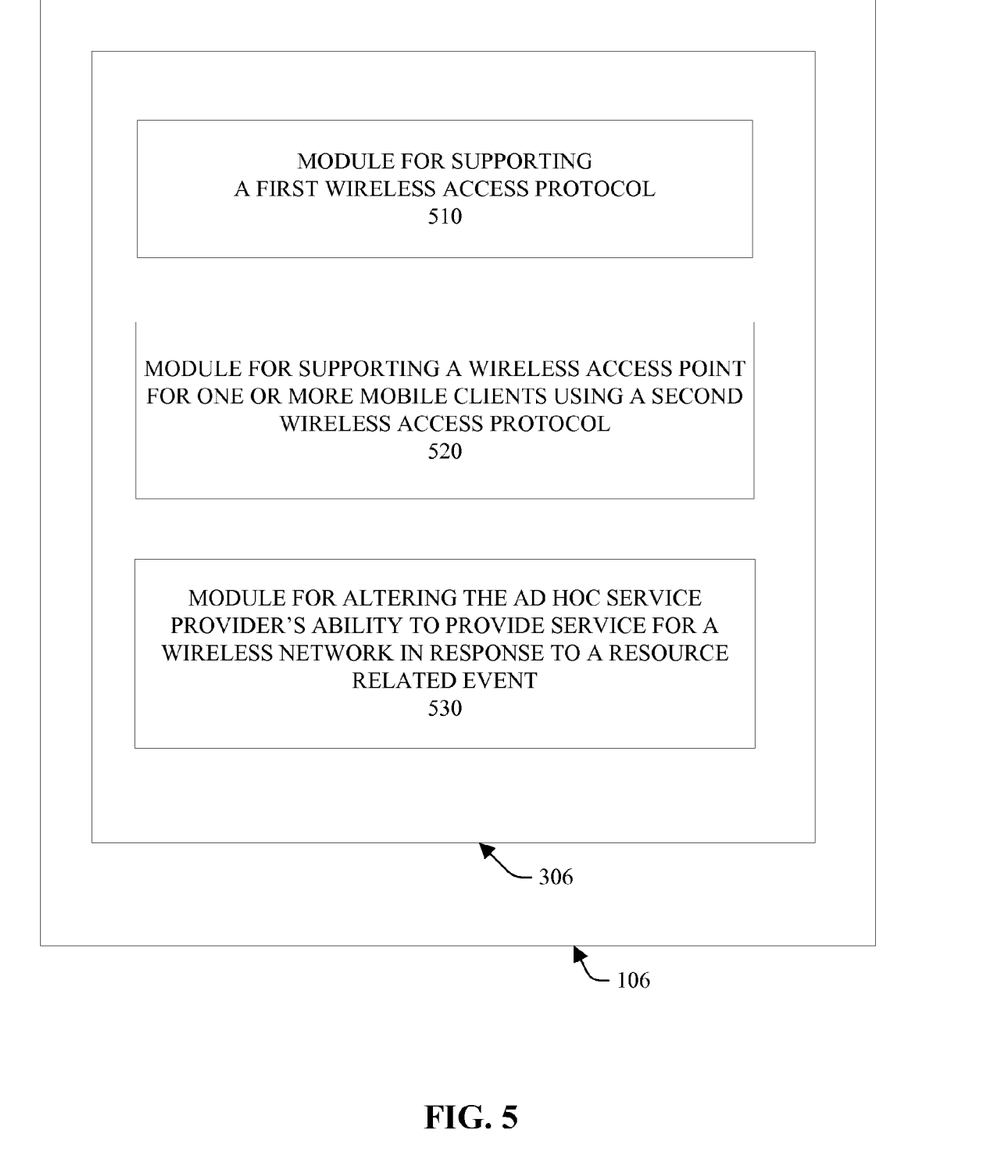
FIG. 5 is a conceptual block diagram of an exemplary configuration of an ad hoc service provider.

FIG. 5 is a conceptual block diagram of an exemplary configuration of an ad hoc service provider. This illustrates an example of the functionality of a processing system in an ad hoc service provider. An ad hoc service provider 106 may be used to establish a wireless network including a server 110 of FIG. 1 and one or more of the mobile clients 108 of FIG. 1.

The ad hoc service provider 106 may include a processing system 306 that includes a module 510 for supporting a first wireless access protocol (e.g., a wireless access protocol for the WWAN). The processing system 306 may also include a module 520 for supporting a wireless access point for one or more of the mobile clients 108 using a second wireless access protocol (e.g., a wireless access protocol for the WLAN). In addition, the processing system 306 may include a module 530 for altering the ad hoc service provider's ability to provide service for a wireless network in response to a resource related event.

According to one aspect of the disclosure, the wireless network is an ad hoc heterogeneous wireless network including a first wireless network and a second wireless network. An ad hoc service provider 106 may comprise a first wireless transceiver to support a first wireless link using the first wireless access protocol and a second wireless transceiver to support a second wireless link using the second wireless access protocol, wherein the processing system is further configured to support the wireless access point by bridging the second wireless link to the first wireless link. The first wireless access protocol may be different from the second wireless access protocol.

An ad hoc service provider 106 may further comprise a user interface 212, and the processing system 306 may be further configured to enable a user to access the wireless network through the user interface 212.

According to one aspect of the disclosure, the wireless network comprises a server, and an ad hoc service provider 106 further comprises means for communicating with the server using the first wireless access protocol and means for communicating with the one or more mobile clients using the second wireless access protocol. An ad hoc service provider may further comprise means for interfacing with a user and means for enabling the user to access the wireless network through the means for interfacing with the user.

According to one aspect of the disclosure, a machine-readable medium is stored with instructions executable by a processing system of a mobile node, and the instructions comprise code for sending, prior to detecting a resource related event, a request that the mobile node be allowed to provide service as an ad hoc service provider for the wireless network. The code for sending may comprise code for sending a request that the mobile node be allowed to provide service as an ad hoc service provider for the wireless network within a geographic location. The instructions may further comprise code for receiving a response that the mobile node is admitted as an ad hoc service provider for the wireless network. The instructions may further comprise code for admitting one or more mobile clients into the wireless network. The code for admitting may be to be executed seamlessly without a mobile subscriber at the mobile node managing the one or more mobile clients. The instructions may further comprise code for determining an action in response to the detection of the resource related event.

According to one aspect of the disclosure, the wireless network comprises the mobile node, a server 110, and one or more mobile clients 108, wherein the instructions may further comprise code for communicating the action to the server 110 using a first wireless access protocol or to the one or more mobile clients 108 using a second wireless access protocol. The mobile node may be registered with a 110 server, one or more mobile clients 108 may be registered with the server 110, and the instructions may comprise code for altering the mobile node's ability to provide service to some or all of the following: the server and the one or more mobile clients.

According to one aspect of the disclosure, the code for detecting a resource related event of a mobile node is to be executed automatically without the intervention from a mobile subscriber of the mobile node, and the code for altering the mobile node's ability to provide service as an ad hoc service provider for a wireless network is to be executed automatically without the intervention from a mobile subscriber of the mobile node.

According to one aspect of the disclosure, the code for sending comprises code for sending to a server from the mobile node a request that the mobile node be allowed to provide service as an ad hoc service provider for the wireless network, the code for detecting comprises code for detecting at the mobile node a resource related event of the mobile node, and the code for altering comprises code for altering at the mobile node the mobile node's ability to provide service for the wireless network in response to detecting the resource related event.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An ad hoc service provider for a wireless network, comprising:
a processing system configured to support a tunnel between a server and one or more mobile clients in the wireless network to provide the one or more mobile clients with access to a remote network, the processing system being configured to detect a resource related event resulting from a change in resource capability within the ad hoc service provider by determining that an available power of the ad hoc service provider has fallen below a predetermined threshold, the processing system being further configured to alter the ad hoc service provider's ability to provide service for the wireless network in response to detecting at the ad hoc service provider the resource related event by handing off at least one of the mobile clients to one or more other ad hoc service providers, wherein handing off the at least one of the mobile clients comprises notifying the server that the ad hoc service provider must hand off the at least one of the mobile clients.

2. The ad hoc service provider of claim 1, wherein to alter the ad hoc service provider's ability, the processing system is configured to disallow admission of any new mobile clients into the wireless network, in response to the resource related event.

3. The ad hoc service provider of claim 1, wherein to alter the ad hoc service provider's ability, the processing system is configured to terminate the ad hoc service provider's service being provided to some or all of the one or more mobile clients currently connected to the ad hoc service provider, in response to the resource related event.

4. The ad hoc service provider of claim 1, wherein the processing system is configured to alter one or more attributes of the service provided by the ad hoc service provider, in response to the resource related event.

5. The ad hoc service provider of claim 4, wherein the one or more attributes comprises a data rate of the ad hoc service provider's service.

6. The ad hoc service provider of claim 1, wherein to alter the ad hoc service provider's ability, the processing system is configured to notify the server and each of some or all of the one or more mobile clients regarding an action in response to the resource related event.

7. The ad hoc service provider of claim 6, wherein the action is one or more of the following: disallowing admission of any new mobile clients into the wireless network; terminating the ad hoc service provider's service being provided to some or all of the one or more mobile clients; or altering one or more attributes of the ad hoc service provider's service.

8. The ad hoc service provider of claim 7, wherein the one or more attributes comprises a data rate of the ad hoc service provider's service or a duration of the ad hoc service provider's service.

9. The ad hoc service provider of claim 6, wherein the action that is different for each of the some or all of the one or more mobile clients.

10. The ad hoc service provider of claim 1, wherein the processing system is further configured to support a first wireless access protocol with the remote network, and wherein the processing system is further configured to provide service to the wireless network for the one or more mobile clients using a second wireless protocol.

11. The ad hoc service provider of claim 10, wherein the first wireless access protocol is different from the second wireless access protocol.

12. The ad hoc service provider of claim 10, wherein the one or more mobile clients cannot support the first wireless access protocol.

13. The ad hoc service provider of claim 1, wherein each of the one or more mobile clients are capable of accessing the remote network when in a coverage region of the remote network only through the server.

14. The ad hoc service provider of claim 1, wherein the remote network is a wireless wide area network, wherein the one or more mobile clients are not subscribers to the wide area network, and wherein the processing system is configured to provide the remote clients with access to the wireless wide area network.

15. The ad hoc service provider of claim 1, wherein the ad hoc service provider is configured to provide network service to a plurality of mobile clients, and wherein the ad hoc service provider is configured to decrease the duration of service provided to a first mobile client of the plurality of mobile clients by a first amount of time and to decrease the duration of service provided to a second mobile client of the plurality of mobile clients by a second amount time responsive to detecting the resource related event.

16. The ad hoc service provider of claim 1, wherein the processing system is further configured to alter the ad hoc service provider's ability to provide service for the wireless network in response to detecting at the ad hoc service provider the resource related event by decreasing a duration of service provided to at least one of the one or more mobile clients.

17. The ad hoc service provider of claim 1, wherein the processing system is further configured to pre-authenticate the at least one of the mobile clients with the one or more other ad hoc service providers by routing authentication messages to and from the server, and wherein handing off each of the at least one of the mobile clients to one or more other ad hoc service providers comprises handing off the at least one of the mobile clients to an ad hoc service provider for which the mobile client has been pre-authenticated.

18. An ad hoc service provider for a wireless network, comprising:
means for supporting a tunnel between a server and one or more mobile clients in the wireless network to provide the one or more mobile clients with access to a remote network;
means for detecting at the mobile node detect a resource related event resulting from a change in resource capability within the ad hoc service provider by determining that an available power of the ad hoc service provider has fallen below a predetermined threshold; and
means for altering the ad hoc service provider's ability to provide service for the wireless network in response to detecting at the ad hoc service provider the resource related event by handing off at least one of the mobile clients to one or more other ad hoc service providers wherein handing off the at least one of the mobile clients comprises notifying the server that the ad hoc service provider must hand off the at least one of the mobile clients.

19. The ad hoc service provider of claim 18, wherein the means for altering is configured to perform one or more of the following: disallowing admission of any new mobile clients into the wireless network, in response to the resource related event; terminating the ad hoc service provider's service being provided to some or all of the one or more mobile clients, in response to the resource related event; altering one or more attributes of the ad hoc service provider's service, in response to the resource related event; or notifying some or all of the one or more mobile clients and the server regarding an action in response to the resource related event.

20. A method of providing service from a mobile node for a wireless network, comprising:
   supporting from the mobile node a tunnel between a server and one or more mobile clients in the wireless network to provide the one or more mobile clients with access to a remote network;
   detecting at the mobile node a resource related event resulting from a change in resource capability within the mobile node for the wireless network by determining that an available power of the ad hoc service provider has fallen below a predetermined threshold; and
   altering the mobile node's ability to provide service for the wireless network in response to the resource related event by handing off at least one of the mobile clients to one or more other ad hoc service providers, wherein handing off the at least one of the mobile clients comprises notifying the server that the ad hoc service provider must hand off the at least one of the mobile clients.

21. The method of claim 20, wherein the mobile node is configured to support a first wireless access protocol, and wherein the mobile node is further configured to provide service to the wireless network for the one or more mobile clients using a second wireless access protocol.

22. The method of claim 20, wherein the altering comprises one or more of the following steps: not admitting any new mobile clients into the wireless network, in response to detecting the resource related event; terminating the mobile node's service being provided to some or all of the one or more mobile clients, in response to the resource related event; altering one or more attributes of the mobile node service, in response to the resource related event; or notifying some or all of the one or more mobile clients and the server regarding an action in response to the resource related event.

23. The method of claim 20, further comprising sending a request to the server that the mobile node be allowed to provide service as an ad hoc service provider.

24. The method of claim 23, wherein the sending a request comprises sending the request that the mobile node be allowed to provide service as the ad hoc service provider for the wireless network within a geographic location.

25. The method of claim 23, further comprising:
   requesting registration of the mobile node with the server, the request including the mobile node desire to provide a wireless access point to the one or more mobile clients, wherein the one or more mobile clients are registered with the server, and wherein the altering comprises altering the mobile node's ability to provide service to some or all of the one or more mobile clients.

26. A non-transitory machine-readable medium comprising instructions executable by a one or more processors in a processing system of a mobile node, the instructions comprising code for:
   supporting from the mobile node a tunnel between a server and one or more mobile clients in a wireless network to provide the one or more mobile clients with access to a remote network;
   detecting at the mobile node a resource related event resulting from a change in resource capability within the mobile node by determining that an available power of the ad hoc service provider has fallen below a predetermined threshold; and
   altering the mobile node's ability to provide service as an ad hoc service provider for the wireless network based on the detection in response to the resource related event by handing off at least one of the mobile clients to one or more other ad hoc service providers, wherein handing off the at least one of the mobile clients comprises notifying the server that the ad hoc service provider must hand off the at least one of the mobile clients.

27. The machine-readable medium of claim 26, wherein the instructions further comprise code for sending, prior to detecting the resource related event, a request that the mobile node be allowed to provide service as an ad hoc service provider for the wireless network.

28. The machine-readable medium of claim 26, wherein the code for altering comprises one or more of the following: code for not admitting any new mobile clients into the wireless network, in response to detecting the resource related event; code for terminating the mobile node's service being provided to some or all of the one or more mobile clients, in response to the resource related event; code for altering one or more attributes of the mobile node's service, in response to the resource related event; or code for notifying some or all of the one or more mobile clients and the server regarding an action in response to the resource related event.

* * * * *